United States Patent [19]

Reinecke et al.

[11] 4,145,089
[45] Mar. 20, 1979

[54] VEHICLE LOAD-CONTROLLED BRAKE PRESSURE REGULATING VALVE DEVICE

[75] Inventors: Erich Reinecke, Burgdorf; Helmut Ulrich, Springe, both of Fed. Rep. of Germany

[73] Assignee: WABCO Westinghouse GmbH, Hannover, Fed. Rep. of Germany

[21] Appl. No.: 839,703

[22] Filed: Oct. 5, 1977

[30] Foreign Application Priority Data

Oct. 14, 1976 [DE] Fed. Rep. of Germany ....... 2646288

[51] Int. Cl.² ............................................. B60T 8/18
[52] U.S. Cl. ..................................... 303/22 R; 303/40
[58] Field of Search ................ 303/22 R, 23 R, 23 A, 303/40, 68, 69

[56] References Cited

U.S. PATENT DOCUMENTS 3,302,982   2/1967   Pekrul ............................... 303/22 R
3,945,689   3/1976   Masuda .............................. 303/22 R

*Primary Examiner*—Trygve M. Blix
*Assistant Examiner*—Reinhard J. Eisenzopf
*Attorney, Agent, or Firm*—R. W. McIntire, Jr.

[57] ABSTRACT

A load-controlled fluid pressure regulating valve device for tractor-trailer type vehicle brake systems which combines in a single housing a unitary piston valve assemblage capable of performing the functions of a relay valve device and a regulating valve device. The unitary valve assemblage is acted upon under normal circumstances by the brake valve control fluid pressure and is further arranged for direct actuation by an emergency piston in the event of fluid pressure loss in the trailer supply line due to uncoupling or to a broken pipe. The valve assemblage is adjustably positioned in accordance with the vehicle load condition such that the relay valve function reflects the load regulating control valve.

10 Claims, 5 Drawing Figures

VEHICLE LOAD-CONTROLLED BRAKE PRESSURE REGULATING VALVE DEVICE

BACKGROUND OF THE INVENTION

The present invention relates to a load-controlled fluid pressure regulating valve device for tractor-trailer type vehicle brake systems.

Because of the desire for fast response times, the use of relay valves has become common practice, wherein multiple supply lines are employed between the tractor and trailer. Accordingly, the brake system should be provided with means for obtaining an emergency brake application in the event of a break in the supply line.

In the known arrangements, separate installations for the relay valve, load regulating valve and emergency valve make such brake systems relatively expensive not only in the initial cost but also because of the difficulty of assembly due to the considerable space requirement and the complex piping configuration that results.

SUMMARY OF THE INVENTION

The object of the invention, therefore, is to provide an economical valve device having a unitary valve construction by means of which the vehicle brake pressure is controlled in the fashion of a relay valve load regulating valve and emergency valve.

In meeting this objective, there is provided a valve device which, by reason of its unitary piston valve assemblage, converts the brake control pressure, which is usually provided by a regulating valve device and supplied to a relay valve device into direct movement of the piston valve assemblage the position of which is adjusted according to the vehicle load condition. The piston valve assemblage directly actuates the supply valve via which fluid pressure from the supply reservoir is admitted to the brake cylinders. As a result, the delay between the moment of brake valve actuation and the moment of full brake pressure admission to the brake cylinders, i.e., the sum of the response time and pressure build-up time is shortened considerably. Accordingly, a substantially reduced construction cost is realized, as compared with known systems using individual valve devices for the different control functions, since fewer valve devices are required. Consequently, less space is needed, as well as less piping and pipe connections.

According to a particular refinement of the valve device of the invention, there is further provided an emergency actuating piston whose movement, upon loss of the air tank supply pressure between the tractor and trailer, is transmitted via the piston valve assemblage to directly actuate the supply valve.

DESCRIPTION AND OPERATION

Figure 2:
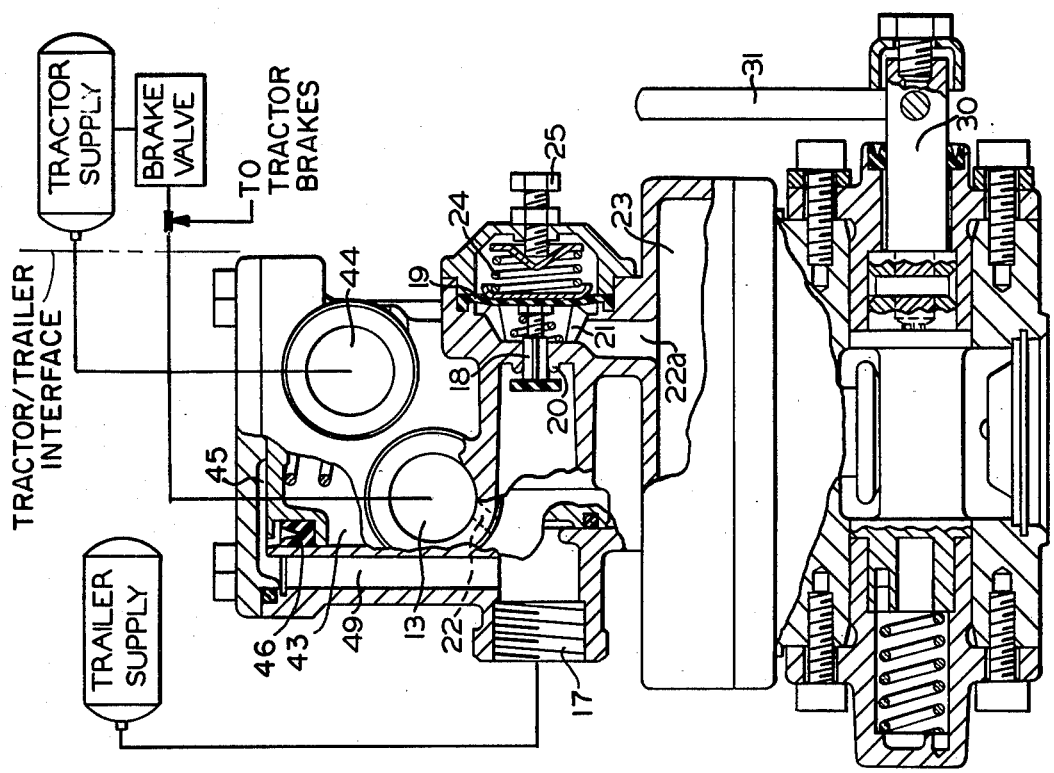
FIG. 2 is a partially sectionalized view of the brake power regulating valve device shown in FIG. 1 and as viewed from the left thereof in the direction indicated by the arrows II.

In an upper part of a sectionalized housing 1, there is provided a self-lapping type piston valve assemblage comprising a relay piston 2 and actuable by a control piston diaphragm secured at its outer periphery in housing 1. Piston 2 has coaxially operably disposed therein a valve member 5 which is biased downwardly, as viewed in the drawing, by a spring 4. Valve member 5 cooperates with a supply valve seat 6 formed on the inner wall of piston 2 and with an exhaust valve seat 7 surrounding the upper end of a hollow piston rod 8 axially aligned underneath valve member 5. Valve member 5, therefore, cooperates with supply valve seat 6 and exhaust valve seat 7 to function as both a supply and exhaust valve. The piston 2 is provided with a plurality of radially outwardly extending fins 9 the lower surfaces of which are tapered to form a conically-shaped surface in juxtaposed relation with diaphragm 3.

Figure 1:
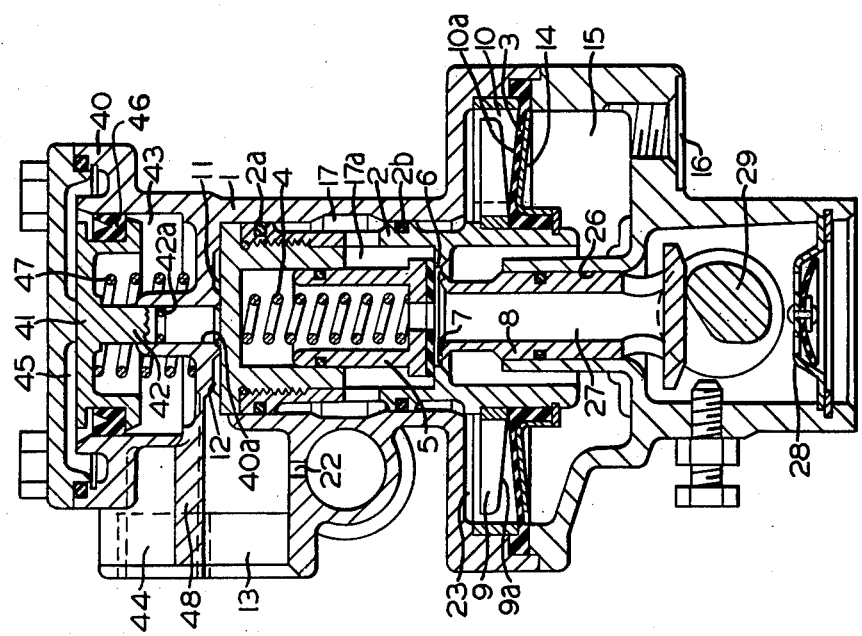
FIG. 1 is a sectional view of a preferred form of the load-controlled brake power regulating valve device according to the invention.
Figure 3:
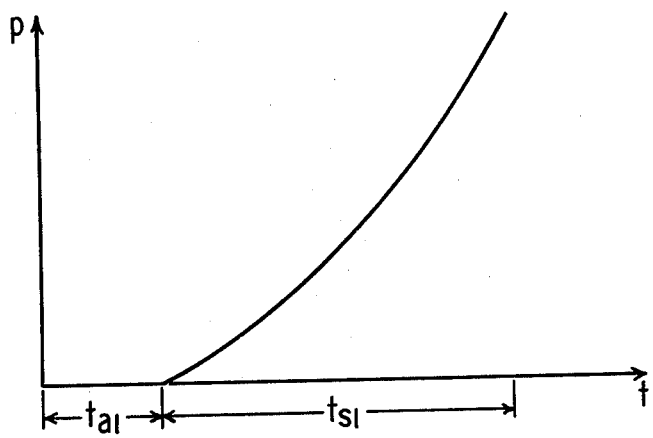
FIGS. 3, 4 and 5 are diagrams in graphic form, showing the relationship between pressure and time in the control process, FIG. 3 showing the ratio when using only one brake pressure control valve, FIG. 4 showing the ratio when using a brake pressure control valve and, in addition, a relay valve, and FIG. 5 showing the ratio when using the brake pressure regulating valve device embodying the invention.
Figure 4:
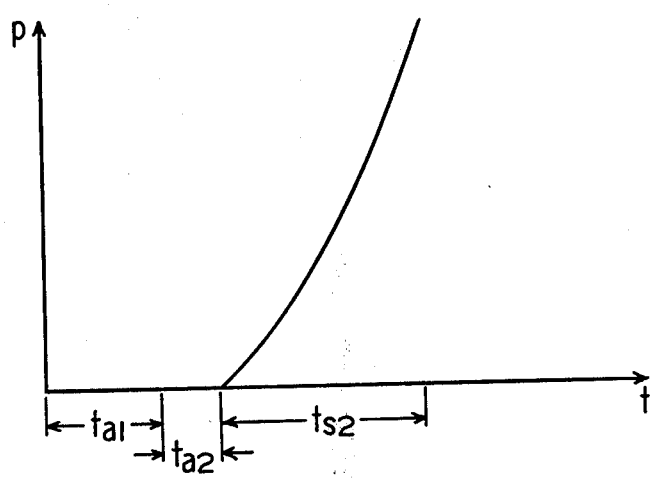
Figure 5:
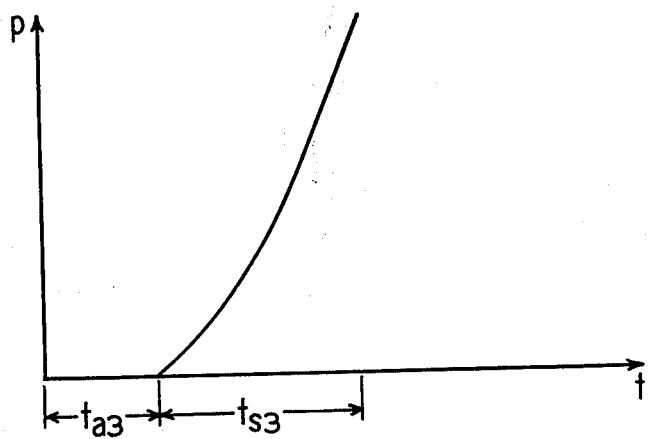

Housing section 1 is provided with a corresponding number of radially inwardly extending fixed fins 10 which are so positioned and spaced as to fit within the interspaces of fins 9 without making contact therewith, said fins 10 also having lower surfaces which form a cone-shaped contour tapered oppositely to that formed by said fins 9 and making contact with diaphragm 3, as shown in FIG. 1.

Diaphragm 3, as above noted is secured at its outer periphery in the housing section 1 and is secured at its inner periphery to piston 2, said piston and diaphragm thus forming the control piston valve assemblage above mentioned. Relay piston 2 has an upper pressure area 11 of fixed dimension and forming part of a control chamber 12 which is located above the relay piston 2 and communicates with a fluid pressure control passageway 13 via which said chamber is communicated with the motor vehicle brake valve shown symbollically. The brake valve is located on the tractor portion of vehicle and connects air from the tractor air supply tank to the tractor brakes and to the trailer control valve device of the present invention, by appropriate piping, as shown. The under side of diaphragm 3 comprises pressure area 14 which partially defines a delivery chamber 15. Chamber 15 communicates with a delivery passageway or outlet 16 via which said chamber is communicated with brake cylinders shown symbollically. Chamber 15 is further communicable, when valve member 5 is in an unseated or open position relative to supply valve seat 6 via a supply chamber 17a, with a fluid pressure supply inlet 17.

In the upper part of the housing section 1, a pilot pressure valve assemblage which comprises a pilot valve member 18 having a fluted stem, and a pilot diaphragm 19 operably connected therewith, is disposed in such a manner that, when said pilot valve member is in an unseated or open position relative to a pilot valve seat 20 fixed in the housing, a fluid pressure connection is established, via a chamber 21 and a passageway 22, between a control chamber 23, located above the diaphragm 3 (and in which fins 11 and 12 are located), and chamber 12. A spring 24 compressibly disposed between the housing section 1 and diaphragm 19 is adjustable by means of a screw 25 so as to set the pilot pressure.

A coaxial bore 26 in housing section 1 coaxially slidably accommodates the hollow rod 8 whose upper open end, as already mentioned, forms the exhaust valve seat 7. When exhaust valve seat 7 occupies an unseated or exhaust position relative to valve member 5, fluid pressure may be vented via a coaxial passageway 27 in rod 8 and a vent port 28. The rod 8 is operably engaged by a cam member 29, whose position is determined by vehicle weight or axle load. A shaft or load lever 30 with a lever 31 secured thereto provides an operating connection between cam 29 and the vehicle axle (not shown). Lever 31, in conventional manner, translates the degree of vehicle spring deflection, as determined by the vehicle load, through shaft 30 to cam 29. If more practical, a metal bellows (not shown) could be employed for translating vehicle spring deflection.

In operation, actuating brake pressure, as delivered by the motor vehicle brake valve is also communicated to control chamber 12 via passageway 13 and flows via passageway 22, past the normally open or unseated valve 18, and via a passageway 22a to the upper face of diaphragm 3. Such control pressure thus acting on the upper face of the diaphragm 3 effects either a reduction or an increase in control pressure in the case of low brake pressure supplied to the subsequent control valve devices and brake cylinders of the system in accordance with the load. When a certain pressure level, which can be set by means of screw 25, is reached in chamber 21, the force thereof acting on diaphragm 19 and against the opposing force of spring 24, causes said diaphragm to be moved in a left-hand direction and thereby moves pilot valve member 18 therewith to a closed or seated position on valve seat 20. At the same time, the brake pressure acting in control chamber 12 also acts on the upper pressure area 11 of piston 2 to cause downward movement thereof along with diaphragm 3. The valve member 5 which also follows this downward movement under the influence of spring 4, first assumes a seated or cut-off position on exhaust valve seat 7 of rod 8 to thus cut off communication to exhaust via passageway 27. Further downward movement of piston 2 causes supply valve seat 6 to open relative to valve member 5. Fluid supply pressure may now flow from supply inlet 17a into supply chamber 17, past said open valve member, via delivery chamber 15, and delivery passageway 16 to the brake cylinders.

During downward movement of piston 2, diaphragm 3 is disengaged from fins 10 and makes increasing contact with fins 9 fixed on said piston. Thus, the effective pressure area of diaphragm 3 is increasingly enlarged until the force acting on the underside of the piston valve assemblage prevails over the force acting on the upper side of said assemblage. As a result, piston 2 moves upwardly again until valve member 5 occupies a seated position on both valve seats 6 and 7, or a lapped position in which the pressure now prevailing in the brake cylinders corresponds to the pressure as controlled in accordance with the weight of the load. With a full-load vehicle situation, valve member 5 remains in an open or "full-load" position as long as such situation prevails and never assumes a lapped position. The pressure which can then be measured in the brake cylinders when the vehicle is fully loaded, corresponds to the pressure supplied to the brake power regulator from the motor vehicle brake valve which is at a 1:1 ratio. On the other hand, when the vehicle is empty or partially loaded, such pressure has been greatly reduced. When brake pressure has been reduced, fluid pressure present in the brake cylinders causes the piston 2 to move to its final, upper or release position, said pressure being vented to atmosphere past unseated valve member 5 and via bore 27 in the rod 8 and vent port 28.

Brake valve housing 1 is provided in its upper area with a housing section 40 separated from housing section 1 by a wall 48. Contained within housing section 40 is an emergency brake piston 41 having a rod 42 which is guidably sealed in a bore 40a in wall 48 and is engageable with the face 11 of piston 2. Fluid pressure in the fluid pressure supply line extending between the tractor and the trailer is admitted via a port connection 44 in housing section 40 to a chamber 43 formed under piston 41. A one-way check valve in the form of an annular lip seal 46 formed by a packing cup that surrounds the periphery of piston 41 conducts the flow of fluid pressure past the piston to a chamber 45 above piston 41, while preventing backflow of fluid pressure from chamber 45 to chamber 43. A passageway 49 (FIG. 2) connects chamber 45 to an air supply tank via the supply inlet connection 17. The supply fluid pressure for the trailer brakes is thus stored in this supply tank. A spring 47 is disposed in chamber 45 so as to urge piston 41 upwardly to its normal position, shown, in which a rod end 42 of piston 41 is disengaged from piston 2.

In operation, loss of the tractor supply line pressure either when uncoupling the trailer or when the line is broken results in the escape of pressure from chamber 43 below piston 41. In that the one-way check action of lip seal 46 prevents fluid pressure in chamber 45 above piston 41 from following the escaping pressure, a force differential arises across the piston in a downward acting direction to overcome the force of spring 47 to allow its rod end 42 to engage and deflect piston 2 downward. Outlet valve 5-7 is initially closed and upon further downward deflection of piston 2, inlet 5-6 is opened, as similarly occurs and previously described in accordance with the supply of brake valve control pressure to the face 11 of piston 2. When the inlet valve 5-6 opens, pressure is communicated therepast from the trailer pressure supply tank and port connection 17 to chamber 15, the connection 16 and the vehicle brake cylinders to obtain a brake application on the trailer irrespective of the brake valve operation or whether the trailer is coupled or not.

Having now described the invention, what I claim as new and desire to secure by Letters Patent, is:

1. A vehicle fluid brake pressure control valve device including a self-lapping piston valve assembly common to a relay valve portion, a load-responsive regulating valve portion and an emergency valve portion of said control valve device, said piston valve assembly being operative to control the vehicle brake cylinder pressure in accordance with the differential force between a brake valve supplied control pressure and the effective brake cylinder pressure acting opposingly on a first member of said piston valve assembly that is movable relative to a second member thereof, said first member including a third member movable relative to said first member, said third member having a valve element engageable with a supply valve seat on said first member to control the delivery of supply fluid pressure and an exhaust valve seat on said second member to control the venting of brake cylinder fluid pressure, said second member being positioned relative to said first member according to the vehicle load condition, thereby varying the effective pressure area of said first member subject to said brake cylinder pressure, said emergency valve portion including actuating piston means engageable with said first member responsive to the loss of said control fluid pressure for controlling brake cylinder pressure via said common piston valve assembly.

2. A control valve device as recited in claim 1, wherein said actuating piston means comprises:
   (a) a fluid pressure responsive emergency piston subject on one side thereof to said supply fluid pressure; and
   (b) a one-way check valve element via which said supply fluid pressure on said one side of said emergency piston is connected to the opposite side thereof, whereby loss of pressure in said supply line creates a pressure differential across said emergency piston in a direction to effect engagement thereof with said first member for urging movement thereof in a direction corresponding to the direction of movement of said first member in response to the supply of said brake valve operated control pressure thereto.

3. A control valve device as recited in claim 2, wherein said actuating piston means further comprises a bias spring urging said emergency piston away from engagement with said first member.

4. A control valve device as recited in claim 3, wherein said piston valve assembly further includes a spring interposed between said first member and said third member to bias said valve element thereof into engagement with said supply valve seat.

5. A control valve device as recited in claim 4, further comprising:
   (a) a first port connection via which the supply fluid pressure is connected from a first fluid pressure tank to said one side of said emergency piston; and
   (b) a second port connection via which the supply fluid pressure on the opposite side of said emergency piston is connected to a second fluid pressure tank, said supply valve seat being subject to the supply fluid pressure of said second fluid pressure tank.

6. A control valve device as recited in claim 5, further comprising pilot valve means for providing a predetermined fluid pressure load on said first member of said piston valve assembly in response to the delivery of the brake valve supplied control pressure thereto to urge said piston valve assembly in a direction opposite the direction in which the brake cylinder pressure acts.

7. A control valve device as recited in claim 6, further characterized in that said brake cylinder pressure acts on said first member in a direction to effect engagement of said supply valve seat with said valve element.

8. A control valve device as recited in claim 7, wherein said first member of said piston valve assembly comprises a first and second piston, said first piston being subject to the brake valve supplied control fluid pressure and said second piston being subject to the effective brake cylinder fluid pressure to provide said differential force on said first member.

9. A control valve device as recited in claim 8, wherein said pilot valve means comprises:
   (a) a diaphragm operated control piston subject to the brake valve supplied control fluid pressure;
   (b) valve means associated with said control piston for connecting the brake valve supplied control fluid pressure to said second piston such as to act thereon in opposition to the brake cylinder fluid pressure acting thereon; and
   (c) spring means for adjustably biasing said control piston in opposition to said brake valve supplied control fluid pressure acting thereon such as to effect closure of said valve means to cut off the brake valve supplied fluid control pressure from said second piston at a predetermined level.

10. A control valve device as recited in claim 8, wherein said second piston comprises:
   (a) an annular diaphragm supported between the casing of said control valve device and said first member of said piston valve assembly; and
   (b) a piston abutment of said first member of said piston valve assembly having a tapered surface juxtaposed with said diaphragm so as to engage a different effective pressure area thereof in accordance with deflection of said first member as defined by the position of said second member to thereby establish said variable effective pressure area of said first member and accordingly adjust the differential force on said first member with the vehicle load condition.

* * * * *